(12) United States Patent
Xue et al.

(10) Patent No.: US 8,335,302 B2
(45) Date of Patent: Dec. 18, 2012

(54) SYSTEM AND METHOD FOR VERIFYING THE USER'S ALIAS

(75) Inventors: Tao Xue, Shenzhen (CN); Hongxing Guo, Shenzhen (CN); Fangmin Deng, Shenzhen (CN); Haiqing Yan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 118 days.

(21) Appl. No.: 13/126,551

(22) PCT Filed: Dec. 22, 2008

(86) PCT No.: PCT/CN2008/073645
§ 371 (c)(1),
(2), (4) Date: Apr. 28, 2011

(87) PCT Pub. No.: WO2010/051671
PCT Pub. Date: May 14, 2010

(65) Prior Publication Data
US 2011/0206195 A1  Aug. 25, 2011

(30) Foreign Application Priority Data
Nov. 10, 2008  (CN) .......................... 2008 1 0177012

(51) Int. Cl.
*H04M 1/56* (2006.01)
*H04M 15/06* (2006.01)

(52) U.S. Cl. .......... 379/142.04; 379/93.23; 379/142.06; 379/142.09; 379/142.17; 455/415

(58) Field of Classification Search ............... 379/88.19, 379/88.2, 93.17, 93.23, 142.01, 142.04, 142.06, 379/142.09, 142.17, 352, 373.01, 373.03; 455/415
See application file for complete search history.

(56) References Cited

U.S. PATENT DOCUMENTS

| | | | | |
|---|---|---|---|---|
| 5,274,699 A | * | 12/1993 | Ranz | 379/142.09 |
| 5,283,824 A | * | 2/1994 | Shaw | 379/142.09 |
| 5,590,184 A | * | 12/1996 | London | 379/142.09 |
| 5,901,209 A | * | 5/1999 | Tannenbaum et al. | 379/142.09 |
| 6,278,774 B1 | * | 8/2001 | Yoshino | 379/100.14 |
| 6,343,120 B1 | * | 1/2002 | Rhodes | 379/142.01 |
| 6,662,006 B2 | * | 12/2003 | Glass | 455/415 |
| 2004/0017899 A1 | * | 1/2004 | Garfinkel et al. | 379/88.21 |
| 2005/0281401 A1 | * | 12/2005 | Creamer et al. | 379/142.06 |
| 2011/0081009 A1 | * | 4/2011 | Ma et al. | 379/142.04 |

FOREIGN PATENT DOCUMENTS

| | | |
|---|---|---|
| CN | 1444381 A | 9/2003 |
| CN | 1523900 A | 8/2004 |
| GB | 2315189 A | 1/1998 |

* cited by examiner

*Primary Examiner* — Binh Tieu
(74) *Attorney, Agent, or Firm* — Dascenzo Intellectual Property Law, P.C.

(57) ABSTRACT

The present invention provides a method and system for verifying a user alias. The method comprises: a calling terminal inserting a set alias and a calling user's own number into calling information when calling a called terminal; after the called terminal receives the calling information, when the calling terminal registers calling number display restriction or when the calling terminal cancels the calling number display restriction and the calling number of the calling is inconsistent with a calling user number stored locally in the called terminal, determining whether the calling user's own number matches successfully with the calling user number stored locally in the called terminal to display in different modes when the matching is successful and unsuccessful, respectively.

12 Claims, 3 Drawing Sheets

SYSTEM AND METHOD FOR VERIFYING THE USER'S ALIAS

TECHNICAL FIELD

The present invention relates to the field of communication technologies, and more particularly, to a system and method for verifying a user alias.

TECHNICAL BACKGROUND

After a user applies a caller ID detection service, which is also known as caller number display service, a phone number of a caller will display on a screen of a mobile phone when the phone is answered. The user may decide whether to answer the phone according to the incoming call number. The mobile phone will utilize this function to store automatically the received or missed incoming call numbers for the user to query.

With the continuous development of the caller ID detection service and the continuous popularization of mobile communication, more and more phone numbers are stored in a mobile phone by people. Only when an incoming call number is exactly a number which has been stored in the mobile phone, the user name of the number which is previously stored by the user can be displayed on the screen of the mobile phone such that the user can recognize it easily. Thus, the following two problems will occur: first, the user can not recognize easily identity of a caller with a number not stored in the user's mobile phone; second, when the user changes his number, he must inform his relatives and friends of the new changed number by group sending short messages or other manners, which brings great inconvenience to the user.

At present, the first problem can be solved in a manner that the user alias is sent to a called terminal together with a calling number and is displayed. For example, the alias is registered in a permanent storage of the calling phone; calling party number display restriction is set in the calling phone; calling information is prepared in the calling phone at any time; in the calling phone, the alias is inserted into a sub-address unit of the calling information; and the calling information is sent from the calling phone to the called phone. For the called phone, calling party number display is set in the called phone; the calling information into which the alias is inserted in the sub-address information unit is received; and in the called phone, the alias is read from the sub-address information unit and displayed.

Although the technical scheme may transmit the user alias to the called party through a call sub-address to display it, the premise of implementing this function is that the calling party sets calling party number display restriction and the called party sets calling party number display, that is, any user may impersonate others to call as long as he sets the calling party number display restriction in his phone and the alias, which brings certain hidden trouble to security of user calling, because the called terminal does not verify the alias.

Solutions for the second problem have not yet been proposed presently.

SUMMARY OF THE INVENTION

A technical problem to be solved by the present invention is to provide a system and method for verifying a user alias so as to resolve security hidden trouble existing in a caller ID detection prompting mode in prior art.

The present invention provides a method for verifying a user alias comprising: a calling terminal inserting a set alias and a calling user's own number into calling information when calling a called terminal; after the called terminal receives the calling information, when the calling terminal registers calling number display restriction or when the calling terminal cancels the calling number display restriction and a calling number of the call is inconsistent with a calling user number stored locally in the called terminal, determining whether the calling user's own number matches successfully with the calling user number stored locally in the called terminal to display in different modes when the matching is successful and unsuccessful, respectively.

Further, when the calling terminal cancels the calling number display restriction and the calling number of the calling is consistent with the calling user number stored locally in the called terminal, the called terminal displays a username corresponding to the calling user number stored locally.

Further, when the matching is successful, the called terminal displays the alias of the calling user or displays both the alias of the calling user and prompt information that the alias has passed security verification.

Further, when the matching is unsuccessful, the called terminal displays the alias of the calling user and prompt information that the alias does not pass the security verification or only displays the prompt information that the alias does not pass the security verification without displaying the alias of the calling user or displays neither the alias of the calling user nor the prompt information that the alias does not pass the security verification.

Further, when the calling terminal cancels the calling number display restriction, if the calling number of the calling terminal is inconsistent with the calling user's own number and the calling user's own number matches successfully with the calling user number stored locally in the called terminal, the called terminal prompts that the calling number has changed and prompts, at the end of the calling, whether to cover the calling user number stored locally in the called terminal with the calling number.

Further, both the alias and the calling user's own number are transmitted in a User-user field in a Setup message of the calling information.

The present invention also provides a system for verifying a user alias including a calling terminal and a called terminal.

The calling terminal includes an inserting module and a calling module.

The insert module is configured to insert a calling user's own number and the alias of the calling user into calling information.

The calling module is configured to initiate a call carrying the calling information to a called user.

The called terminal includes a storage module, a detection module, a matching module and a processing module.

The storage module is configured to store a calling user number.

The detection module is configured to extract the alias of the calling user and the calling user's own number from the calling information to send them to the matching module when the calling terminal registers calling number display restriction, and extract the alias of the calling user, the calling user's own number and the calling number from the calling information to send them to the matching module when the calling terminal cancels the calling number display restriction.

The matching module is configured to determine whether the calling user's own number matches successfully with the calling user number stored in the storage module when the calling terminal registers the calling number display restriction or when the calling terminal cancels the calling number display restriction and the calling number of the call is inconsistent with the calling user number stored locally in the called terminal and send results of the determination to the processing module.

The processing module is configured to display in different modes when the matching is successful and unsuccessful, respectively.

Further, the matching module is configured to send a message that the calling user's own number matches successfully with the calling user number to the processing module when the calling user's own number is consistent with the calling user number stored in the storage module.

The processing module is further configured to display the alias of the calling user or display both the alias of the calling user and prompt information that the alias has passed security verification after receiving the message that the calling user's own number matches successfully with the calling user number.

Further, the matching module is configured to send a message that the matching is unsuccessful to the processing module when the calling terminal registers the calling number display restriction and the calling user's own number is inconsistent with the calling user number stored in the storage module or the calling user number is not stored in the storage module, and when the calling terminal cancels the calling number display restriction and both the calling number and the calling user's own number are inconsistent with the calling user number stored in the storage module or the calling user number is not stored in the storage module.

After receiving the message that the matching is unsuccessful, the processing module displays the alias of the calling user and prompt information that the alias does not pass security verification, or only displays prompt information that the alias does not pass the security verification without displaying the alias of the calling user, or displays neither the alias of the calling user nor prompt information that the alias does not pass the security verification.

Further, the storage module is also configured to store a username corresponding to the calling user number.

The matching module is further configured to send a message that the calling number matches successfully with the calling user number to the processing module when the calling terminal cancels the calling user display restriction and the calling number is consistent with the calling user number stored in the storage module.

The processing module displays the username corresponding to the calling user number stored in the storage module after receiving the message that the calling number matches successfully with the calling user number.

Further, the matching module is also configured to determine whether the calling number is consistent with the calling user's own number, and if not and when the calling user's own number matches successfully with the calling user number stored locally in the called terminal, send a notice that the calling number is inconsistent with the calling number's own number to the processing module.

The processing module is further configured to prompt that the calling number has been changed after receiving the notice that the calling number is inconsistent with the calling number's own number and prompt, at the end of the calling, whether to cover the calling user number stored in the storage module with the calling number.

Further, the insert module inserts both the alias of the calling user and the calling user's own number into a User-user field in a Setup message of the calling information.

To sum up, the present invention provides a system and method for verifying an user alias which is able to not only inform, after the calling user changes the number, the change when the called terminal is called, but also remind a certain user to take care when someone impersonate others to call this user such that security hidden trouble existing in prompting modes of caller ID detection in prior art is eliminated successfully.

PREFERRED EMBODIMENTS OF THE INVENTION

The technical scheme of the present invention will be described in more detail in conjunction with the accompanying drawings and embodiments.

One of objects of the present invention is to provide a method and system for verifying a user alias, in which a calling user records a set alias and its own number in calling information when calling a called user; the called user extracts the alias of the calling user and the calling user's own number after receiving the calling information, determining whether the calling user's own number matches successfully with a calling user number stored locally by the called user and adopting different display modes according to results of the determination.

Figure 1:
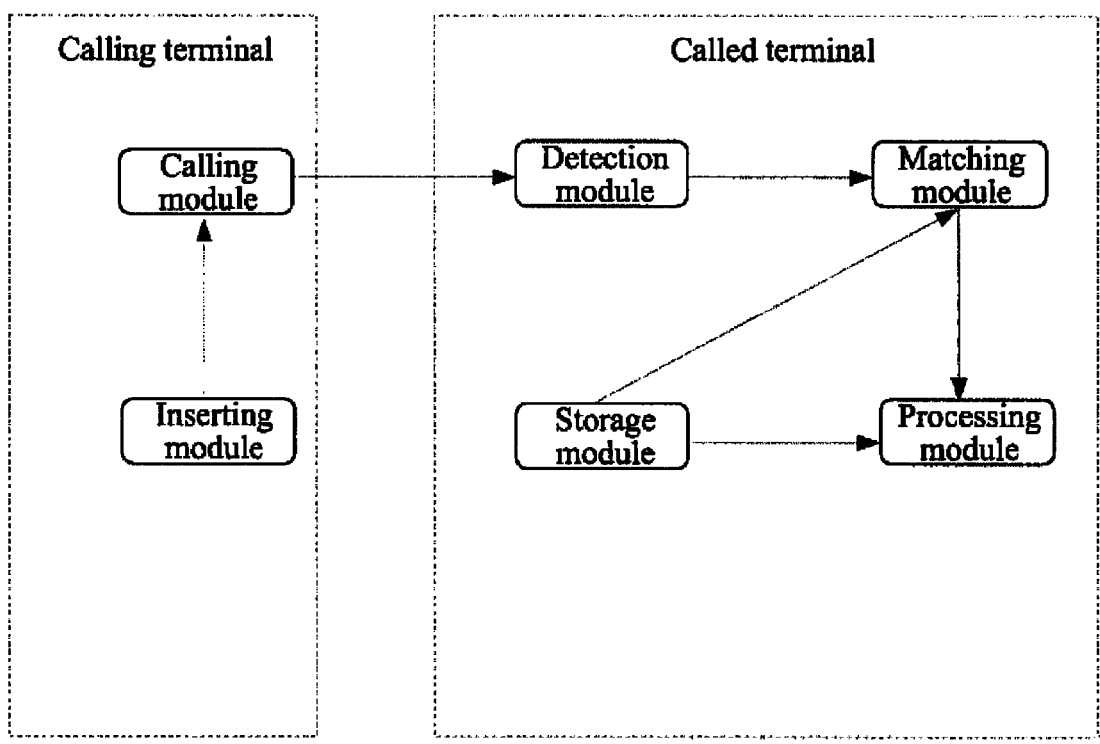
FIG. 1 is a block diagram of a system in accordance with the present invention.

This embodiment provides a system for verifying a user alias. As shown in FIG. 1, the system includes a calling terminal and a called terminal. The calling terminal includes an inserting module and a calling module, and the called terminal includes a detection module, a matching module, a storage module and a processing module The inserting module is configured to insert the calling user's own number and the alias of the calling user into calling information. The calling user's own number is edited by the calling user himself and the called user is expected to believe that this number is dialed. The inserting module may but not limit to insert the alias of the calling user and the calling user's own number into a User-user field in a Setup message of the calling information.

The calling module is configured to initiate a call carrying the call information to the called user.

The detection module is configured to extract the alias of the calling user and the calling user's own number from the calling information, and to extract the calling number from the calling information to send it to the matching module when the calling user cancels calling number display restriction.

The storage module is configured to store the calling user number, which is a phone number of a contact stored in the called terminal, and its corresponding username.

The matching module is configured to send a message that the matching is successful to the processing module when the calling user's own number is consistent with the calling user number stored in the storage module.

The matching module is also configured to send a message that the matching is unsuccessful to the processing module when the calling terminal registers the calling number display restriction and the calling user's own number is inconsistent with the calling user number stored in the storage module or the calling user number is not stored in the storage module, and when the calling terminal cancels the calling number display restriction and both the calling number and the calling user's own number are inconsistent with the calling user number stored in the storage module or the calling user number is not stored in the storage module.

The matching module is further configured to send a message that the calling number matches successfully with the calling user number to the processing module when the calling terminal cancels the calling user display restriction and the calling number is consistent with the calling user number stored in the storage module.

The matching module is further configured to determine whether the calling number is consistent with the calling user's own number when the calling user's own number is consistent with the calling user number stored in the storage module and send results of the determination to the processing module, wherein the calling number is the phone number that is actually used by the calling user.

The processing module is configured to adopt different display modes according to the results of the determination. The display modes refer to specifically:

displaying the alias of the calling user or displaying both the alias of the calling user and prompt information that the alias has passed security verification after the receipt of the message that the calling user's own number matches successfully with the calling user number;

after the receipt of the message that the matching is unsuccessful, displaying the alias of the calling user and prompt information that the alias does not pass security verification, or only displaying prompt information that the calling user does not pass the security verification not the alias of the calling user, or displaying neither the alias of the calling user nor prompt information that the alias does not pass the security verification; and displaying a username corresponding to the calling user number stored in the storage module after the receipt of a message that the calling number matches successfully with the calling user number.

The processing module is further configured to prompt that the calling number has been changed after receiving a notice that the calling user's own number is inconsistent with the calling user number stored in the storage module and prompt, at the end of the calling, whether to cover the calling user number stored in the storage module with the calling number.

The present invention further provides a method for verifying a user alias comprising: setting an alias and a calling user's own number at a calling user terminal; inserting the alias and the calling user's own number into an appointed field in calling information when a call is initiated; extracting the alias of the calling user, the calling user's own number and a calling number from the calling information after the called user receives the calling information; determining the consistency between the calling user's own number, the calling number and the calling user number stored by the called user; and displaying the alias of the calling user and the calling number according to results of consistency determination.

Two cases where a calling terminal registers calling number display restriction and it cancels the calling number display restriction will be described below respectively.

Figure 2:
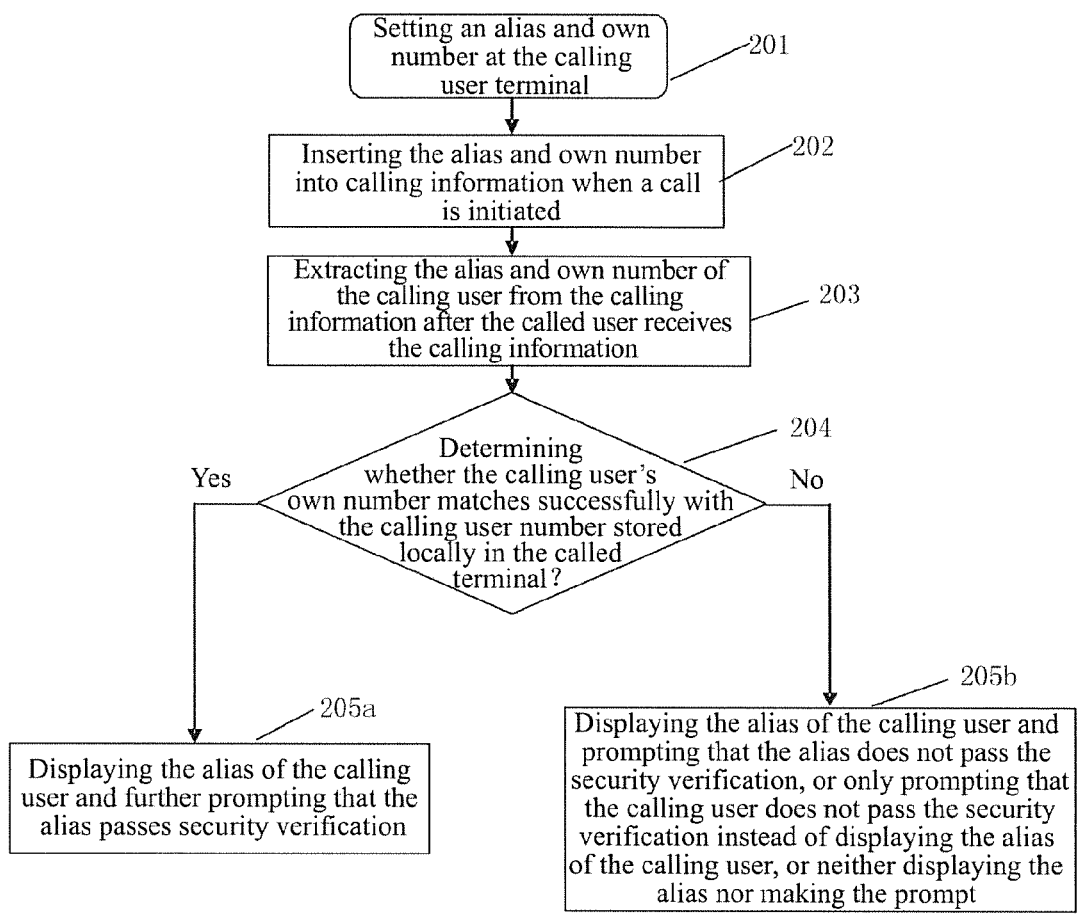
FIG. 2 is a logic flow chart of verifying a user alias with an incoming call when a calling user registers calling number display restriction in accordance with the present invention.

FIG. 2 is a logic flow chart of verifying a user alias with an incoming call when a calling user registers calling number display restriction which comprises the following steps.

Step 201: the calling user sets an alias and the calling user's own number.

The calling user's own number is edited by the calling user himself and the called user is expected to believe that this number is dialed.

Step 202: the alias and the calling user's own number are inserted into an appointed field in calling information when a call is initiated. The appointed field may be but not limit to a User-user field in a Setup message defined in Q.931.

Step 203: the called user extracts the alias of the calling user and the calling user's own number from the calling information after receiving the calling information.

Step 204: whether the calling user's own number matches successfully with the calling user number stored locally in the called terminal is determined, step 205a is executed if the matching is successful and step 205b is executed if the matching is unsuccessful. Successful matching means that the calling user's own number is consistent with the calling user number stored in the called terminal, and the unsuccessful matching means that the calling user's own number is inconsistent with the calling user number stored in the called terminal or the calling number is not stored in the called terminal.

The calling user number stored locally in the called terminal is the stored phone number of a contact.

Step 205a: the alias of the calling user is displayed and prompt information that the alias passes security verification may be further displayed.

Step 205b: the alias of the calling user is displayed and prompt information that the alias does not pass the security verification is displayed, or the alias of the calling user is not displayed and only prompt information that the calling user does not pass the security verification is displayed, or neither the alias nor the prompt information is displayed.

After the step 205, if the called user chooses to end the calling or continue calling, then the process proceeds to corresponding procedures, which are the same as the prior art and will not further described any more.

Using this scheme, the called user may determine whether the calling user impersonates others to call by comparing the calling user's own number with the calling user number stored locally, because the calling number usually does not know the true number of the impersonated person when impersonating others to call.

Figure 3:
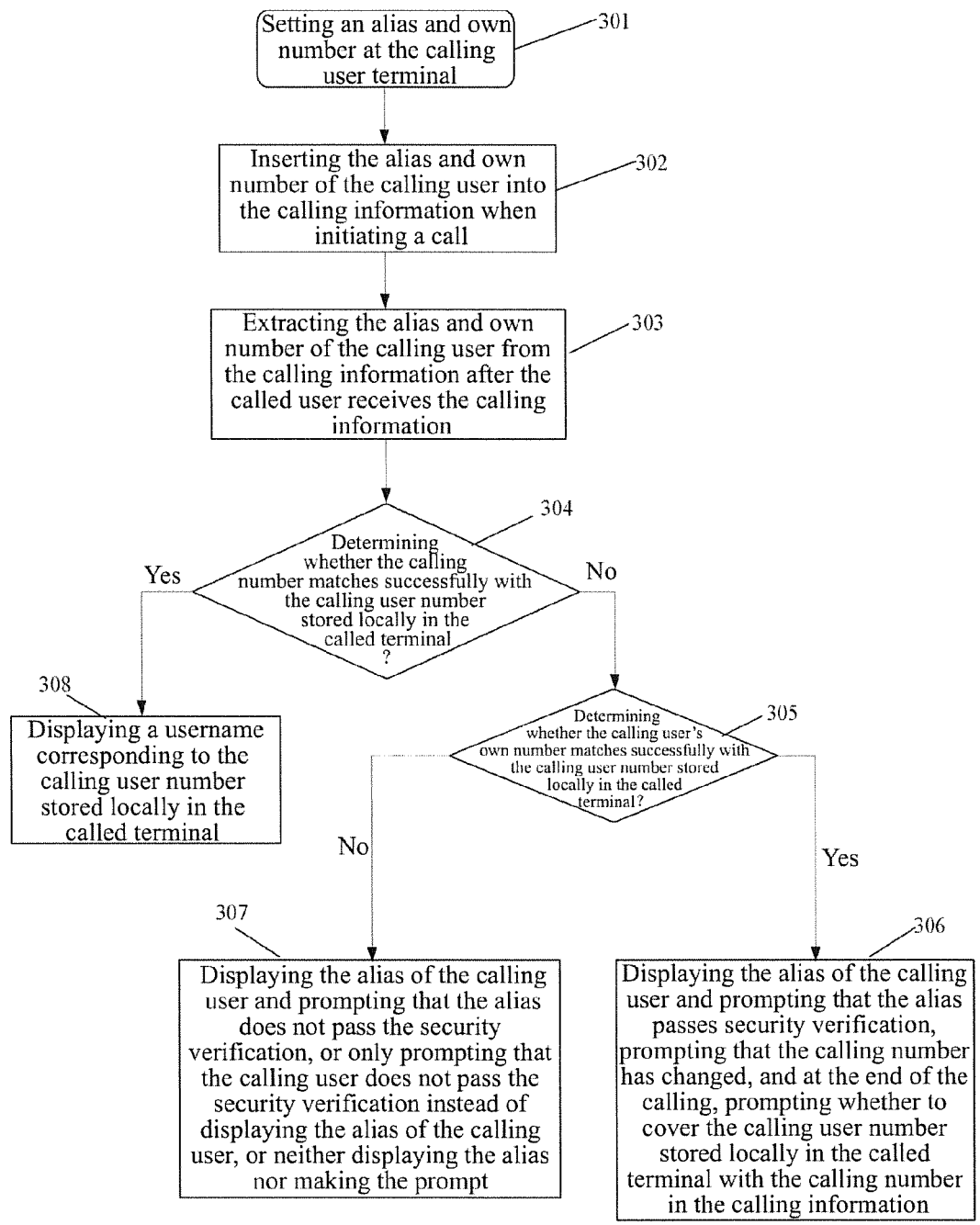
FIG. 3 is a logic flow chart of verifying a user alias with an incoming call when a calling user cancels calling number display restriction in accordance with the present invention.

FIG. 3 is a logic flow chart of verifying a user alias with an incoming call when a calling user cancels calling number display restriction in accordance with the present invention which comprises the following steps.

When the calling user changes his number, i.e., when the used number is changed, the calling user may insert the number before changing as the calling user's own number into calling information in order to inform the other part that the number has been changed.

Step 301: the calling user sets an alias and the calling user's own number.

Step 302: the calling user inserts the set alias and the calling user's own number into an appointed field in the calling information when initiating a call. The appointed field may be but not limit to a User-user field in a Setup message defined in Q.931.

Step 303: the called user extracts the alias of the calling user, the calling user's own number and calling number from the calling information after receiving the calling information.

Step 304: whether the calling number matches successfully with the calling user number stored locally in the called terminal is determined, and step 308 is executed if yes and step 305 is executed if no.

Step 305: whether the calling user's own number matches successfully with the calling user number stored locally in the called terminal is determined, and step 306 is executed if yes and step 307 is executed if no.

Successful matching means that the calling user's own number is consistent with the calling user number stored in the called terminal, and the unsuccessful matching means that the calling user's own number is inconsistent with the calling user number stored in the called terminal or the calling user number is not stored in the called terminal.

Step 306: the alias of the calling user is displayed and prompt information that the alias passes security verification may be further displayed, that the calling number has changed is prompted and at the end of the calling, whether to cover the calling user number stored locally in the called terminal with the calling number in the calling information may be prompted. In this step the calling number may be further displayed.

Step 307: the alias of the calling user is displayed and prompt information that the alias does not pass the security verification is displayed, or the alias of the calling user is not displayed and only prompt information that the calling user does not pass the security verification is displayed, or neither the alias nor the prompt information is displayed. In this step the calling number may be further displayed.

Step 308: a username corresponding to the calling user number stored locally in the called terminal is displayed.

The above steps may be executed in no particular order, as long as they conform to the above-described logic.

After the step 306, 307 and 308, if the user chooses to end the calling or continue the calling, then the process proceeds to corresponding procedures, which are the same as the prior art and will not further described any more.

The method of verifying a user alias with an incoming call disclosed by the present invention makes full use of simplicity and easy alteration of user terminal software upgrade such that the user terminal can have a function of verifying a user alias with an incoming call only by altering the user terminal software appropriately. The apparatus of verifying a user alias with an incoming call disclosed by the present invention may apply to various types of phone terminals, which, whether a fixed network phone terminal or a mobile phone terminal, can implement the function of verifying a user alias with an incoming call conveniently. Instead of altering and upgrading switch devices of existing phone networks, telecommunication operators only need to alter appropriately the user terminal software (add corresponding service software modules) to satisfy the demand.

Table 1 is an encoding mode for transmitting an alias in calling information enumerated in this embodiment. This table shows an encoding format of a User-user field defined in 3GPP TS 24.008 V5.16.0 (2006-06).

TABLE 1

| the coding format of the User-user field | | | | | | | | |
|---|---|---|---|---|---|---|---|---|
| 8 | 7 | 6 | 5 | 4 | 3 | 2 | 1 | |
| | | | | User-user IEI | | | | octet 1 |
| | | | Length of user-user contents | | | | | octet 2 |
| | | | User-user protocol discriminator | | | | | octet 3 |
| | | | User-user information | | | | | octet 4* |
| | | | | | | | | octet N* |

An unused octet may be selected arbitrarily from octet 3 shown in Table 1 as protocol discriminator transmitted by the alias of the calling user, as shown in FIG. 2, the case where 0×5 is used as the protocol discriminator of the alias is provided. According to regulations of 3GPP TS 24.008 V5.16.0 (2006-06), the length range of the User-user field is from 35 to 131 octets. After the necessary first 3 octets are deducted, alias information of the user may be transmitted in a field of 28 to 128 octets in the range of User-user information. The 28 to 128 octets may be encoded in a manner agreed by the calling user and the called user for transmitting alias information of the user. Specific encoding modes are numerous and will be not enumerated herein one by one. In addition to the User-user field, other fields may be used. Their encoding modes are the same and will not be enumerated herein one by one as well.

According to a block diagram of the system, the system may be applied widely to various terminal devices, such as mobile phone, desktop phone, etc.

TABLE 2

| an encoding mode for transmitting the alias of the calling user in octet 3 User-user protocol discriminator (octet 3) | | | | | | | | |
|---|---|---|---|---|---|---|---|---|
| Bits | | | | | | | | |
| 8 | 7 | 6 | 5 | 4 | 3 | 2 | 1 | |
| 0 | 0 | 0 | 0 | 0 | 0 | 0 | 0 | User specific protocol (Note 1) |
| 0 | 0 | 0 | 0 | 0 | 0 | 0 | 1 | OSI high layer protocols |
| 0 | 0 | 0 | 0 | 0 | 0 | 1 | 0 | X.244 (Note 2) |
| 0 | 0 | 0 | 0 | 0 | 0 | 1 | 1 | Reserved for system management convergence function |
| 0 | 0 | 0 | 0 | 0 | 1 | 0 | 0 | IA5 characters (Note 3) |
| 0 | 0 | 0 | 0 | 0 | 1 | 0 | 1 | Alias |
| 0 | 0 | 0 | 0 | 0 | 1 | 1 | 1 | Rec.V.120 rate adaption |
| 0 | 0 | 0 | 0 | 1 | 0 | 0 | 0 | Q.931 (I.451) user-network call control messages |
| 0 | 0 | 0 | 1 | 0 | 0 | 0 | 0 | Reserved for other network layer or layer 3 protocols |
| 0 | 0 | 1 | 1 | 1 | 1 | 1 | 1 | through |
| 0 | 1 | 0 | 0 | 0 | 0 | 0 | 0 | National use |
| 0 | 1 | 0 | 0 | 1 | 1 | 1 | 1 | through |
| 0 | 1 | 0 | 1 | 0 | 0 | 0 | 0 | Reserved for other network layer or layer 3 protocols |
| 1 | 1 | 1 | 1 | 1 | 1 | 1 | 0 | through |

All other values are reserved.
(Note 1): The user information is structured according to user needs.
(Note 2): The user information is structured according to Rec.X.244 which specifies the structure of X.25 call user data.
(Note 3): The user information consists of IA5 characters.

Of course, many other embodiments in accordance with the present invention may be used. Various corresponding modifications and variations can be made by a person having ordinary skills in the art according to the present invention without departing from the spirit and essence of the present invention. However, these corresponding modifications and variations should be within the protect range of the appended claim of the present invention.

INDUSTRIAL APPLICABILITY

The technical scheme in accordance with the present invention is able to not only inform, after the calling user changes the number, the change when the called terminal is called, but also remind a certain user to take care when someone impersonate others to call this user such that security hidden trouble existing in prompting modes of caller ID detection in prior art is eliminated successfully.

What we claim is:

1. A method for verifying a user alias comprising: a calling terminal inserting a set alias and a calling user's own number into calling information when calling a called terminal; after the called terminal receives the calling information, when the calling terminal registers calling number display restriction or when the calling terminal cancels the calling number display restriction and a calling number of the call is inconsistent with a calling user number stored locally in the called terminal, determining whether the calling user's own number matches successfully with the calling user number stored locally in the called terminal to display in different modes when the matching is successful and unsuccessful, respectively.

2. The method according to claim 1, further comprising:
when the calling terminal cancels the calling number display restriction and the calling number of the call is consistent with the calling user number stored locally in the called terminal, the called terminal displays a username corresponding to the calling user number stored locally.

3. The method according to claim 1, wherein
when the matching is successful, the called terminal displays the alias of the calling user or displays both the alias of the calling user and prompt information that the alias has passed security verification.

4. The method according to claim 1, wherein
when the matching is unsuccessful, the called terminal displays the alias of the calling user and prompt information that the alias does not pass security verification, or only displays the prompt information that the alias does not pass the security verification without displaying the alias of the calling user, or displays neither the alias of the calling user nor the prompt information that the alias does not pass the security verification.

5. The method according to claim 1, further comprising:
when the calling terminal cancels the calling number display restriction, if the calling number of the calling terminal is inconsistent with the calling user's own number and the calling user's own number matches successfully with the calling user number stored locally in the called terminal, the called terminal prompting that the calling number has changed and prompting, at the end of the calling, whether to cover the calling user number stored locally in the called terminal with the calling number.

6. The method according to claim 1, wherein both the alias and the calling user's own number are transmitted in a User-user field in a Setup message of the calling information.

7. A system for verifying a user alias including a calling terminal and a called terminal, wherein
the calling terminal includes an inserting module and a calling module;
the inserting module is configured to insert a calling user's own number and an alias of the calling user into calling information;
the calling module is configured to initiate a call carrying the calling information to a called user;
the called terminal includes a storage module, a detection module, a matching module and a processing module;
the storage module is configured to store a calling user number;
the detection module is configured to extract the alias of the calling user and the calling user's own number from calling information to send the alias of the calling user and the calling user's own number to the matching module when the calling terminal registers calling number display restriction, and to extract the alias of the calling user, the calling user's own number and a calling number from the calling information to send the alias of the calling user, the calling user's own number and the calling number to the matching module when the calling terminal cancels the calling number display restriction;
the matching module is configured to determine whether the calling user's own number matches successfully with the calling user number stored in the storage module when the calling terminal registers the calling number display restriction, or when the calling terminal cancels the calling number display restriction and the calling number of the call is inconsistent with the calling user number stored locally in the called terminal and to send results of the determination to the processing module; and
the processing module is configured to display in different modes when the matching is successful and unsuccessful, respectively.

8. The system according to claim 7, wherein
the matching module is configured to send a message that the calling user's own number matches successfully with the calling user number to the processing module when the calling user's own number is consistent with the calling user number stored in the storage module; and
the processing module is configured to display the alias of the calling user or display both the alias of the calling user and prompt information that the alias has passed security verification after receiving the message that the calling user's own number matches successfully with the calling user number.

9. The system according to claim 7, wherein
the matching module is configured to send a message that the matching is unsuccessful to the processing module when the calling terminal registers the calling number display restriction and the calling user's own number is inconsistent with the calling user number stored in the storage module or the calling user number is not stored in the storage module, and when the calling terminal cancels the calling number display restriction and both the calling number and the calling user's own number are inconsistent with the calling user number stored in the storage module or the calling user number is not stored in the storage module; and
after receiving the message that the matching is unsuccessful, the processing module displays the alias of the calling user and prompt information that the alias does not pass security verification, or only displays prompt information that the alias does not pass the security verification without displaying the alias of the calling user, or displays neither the alias of the calling user nor prompt information that the alias does not pass the security verification.

10. The system according to claim 7, wherein
the storage module is further configured to store a username corresponding to the calling user number; and
the matching module is further configured to send a message that the calling number matches successfully with the calling user number to the processing module when the calling terminal cancels the calling user display restriction and the calling number is consistent with the calling user number stored in the storage module; and
the processing module displays the username corresponding to the calling user number stored in the storage module after receiving the message that the calling number matches successfully with the calling user number.

11. The system according to claim 8, wherein
the matching module is further configured to determine whether the calling number is consistent with the calling user's own number, and if not and when the calling user's own number matches successfully with the calling user number stored locally in the called terminal, to send a notice that the calling number is inconsistent with the calling number's own number to the processing module; and the processing module is further configured to prompt that the calling number has been changed after receiving the notice that the calling number is inconsistent with the calling number's own number and to prompt, at the end of the calling, whether to cover the calling user number stored in the storage module with the calling number.

12. The system according to claim 7, wherein the inserting module inserts both the alias of the calling user and the calling user's own number into a User-user field in a Setup message of the calling information.

* * * * *